US010272848B2

(12) United States Patent
Troxel

(10) Patent No.: US 10,272,848 B2
(45) Date of Patent: Apr. 30, 2019

(54) MOBILE VIDEO AND IMAGING SYSTEM

(71) Applicant: Digital Ally, Inc., Lenexa, KS (US)

(72) Inventor: Jason R. Troxel, Lee's Summit, MO (US)

(73) Assignee: Digital Ally, Inc., Lenexa, KS (US)

( * ) Notice: Subject to any disclaimer, the term of this patent is extended or adjusted under 35 U.S.C. 154(b) by 99 days.

(21) Appl. No.: 14/040,006

(22) Filed: Sep. 27, 2013

(65) Prior Publication Data

US 2014/0092251 A1 Apr. 3, 2014

Related U.S. Application Data

(60) Provisional application No. 61/707,326, filed on Sep. 28, 2012, provisional application No. 61/707,348, filed on Sep. 28, 2012.

(51) Int. Cl.
*G07C 5/08* (2006.01)
*H04N 7/18* (2006.01)
*B60R 11/00* (2006.01)
*B60R 11/04* (2006.01)

(52) U.S. Cl.
CPC ............ *B60R 11/04* (2013.01); *G07C 5/0866* (2013.01); *H04N 7/183* (2013.01); *B60R 2011/0089* (2013.01)

(58) Field of Classification Search
CPC ....................................................... B60R 11/04
USPC ......................................................... 348/148
See application file for complete search history.

(56) References Cited

U.S. PATENT DOCUMENTS

| 4,409,670 A | 10/1983 | Herndon et al. |
| 4,789,904 A | 12/1988 | Peterson |
| 4,863,130 A | 9/1989 | Marks, Jr. |
| 4,918,473 A | 4/1990 | Blackshear |
| 5,027,104 A | 6/1991 | Reid |
| 5,064,157 A * | 11/1991 | O'Neal ................. B62K 21/12 248/230.1 |
| 5,096,287 A | 3/1992 | Kaikinami et al. |
| 5,111,289 A | 5/1992 | Lucas et al. |
| 5,289,321 A | 2/1994 | Secor |

(Continued)

FOREIGN PATENT DOCUMENTS

| DE | 102010019451 A1 | 11/2011 |
| EP | 247993 A2 | 7/2012 |

(Continued)

OTHER PUBLICATIONS

Notification of Transmittal of the International Search Report and the Written Opinion of the International Searching Authority, or the Declaration dated Jan. 30, 2014; International Application No. PCT/US2013/062415; International Filing Date: Sep. 27, 2013; Applicant: Digital Ally, Inc.

(Continued)

*Primary Examiner* — Mohammed S Rahaman
*Assistant Examiner* — Richard A Hansell, Jr.
(74) *Attorney, Agent, or Firm* — Erise IP, P.A.

(57) ABSTRACT

An all-weather non-enclosed-vehicle mounted system for recording video and audio. The weatherproof system comprises an interface for connecting various system components and external devices, a display monitor integrated into the same housing as an electronics module operable to receive the video and audio, and a memory operable to receive and store the video and audio.

18 Claims, 6 Drawing Sheets

(56) References Cited

U.S. PATENT DOCUMENTS

| | | |
|---|---|---|
| 5,381,155 A | 1/1995 | Gerber |
| 5,408,330 A | 4/1995 | Squicciarii et al. |
| 5,446,659 A | 8/1995 | Yamawaki |
| 5,453,939 A | 9/1995 | Hoffman et al. |
| 5,473,729 A | 12/1995 | Bryant et al. |
| 5,479,149 A | 12/1995 | Pike |
| 5,497,419 A | 3/1996 | Hill |
| 5,526,133 A | 6/1996 | Paff |
| 5,585,798 A | 12/1996 | Yoshioka et al. |
| 5,642,285 A | 6/1997 | Woo et al. |
| 5,668,675 A | 9/1997 | Fredricks |
| 5,689,442 A | 11/1997 | Swanson et al. |
| 5,742,336 A | 4/1998 | Lee |
| 5,752,632 A | 5/1998 | Sanderson et al. |
| 5,798,458 A | 8/1998 | Monroe |
| 5,815,093 A | 9/1998 | Kikinis |
| 5,850,613 A | 12/1998 | Bullecks |
| 5,878,283 A | 3/1999 | House et al. |
| 5,886,739 A | 3/1999 | Winningstad |
| 5,890,079 A | 3/1999 | Levine |
| 5,926,210 A | 7/1999 | Hackett et al. |
| 5,962,806 A | 10/1999 | Coakley et al. |
| 5,978,017 A | 11/1999 | Tino |
| 5,983,161 A | 11/1999 | Lemelson et al. |
| 5,996,023 A | 11/1999 | Winter et al. |
| 6,008,841 A | 12/1999 | Charlson |
| 6,028,528 A | 2/2000 | Lorenzetti et al. |
| 6,052,068 A | 4/2000 | Price R-W et al. |
| 6,097,429 A | 8/2000 | Seeley et al. |
| 6,100,806 A | 8/2000 | Gaukel |
| 6,121,881 A | 9/2000 | Bieback et al. |
| 6,141,609 A | 10/2000 | Herdeg et al. |
| 6,141,611 A | 10/2000 | Mackey et al. |
| 6,163,338 A | 12/2000 | Johnson et al. |
| 6,175,300 B1 | 1/2001 | Kendrick |
| 6,298,290 B1 | 10/2001 | Abe et al. |
| 6,310,541 B1 | 10/2001 | Atkins |
| 6,314,364 B1 | 11/2001 | Nakamura |
| 6,324,053 B1 | 11/2001 | Kamijo |
| 6,326,900 B2 | 12/2001 | Deline et al. |
| 6,333,694 B2 | 12/2001 | Pierce et al. |
| 6,333,759 B1 | 12/2001 | Mazzilli |
| 6,370,475 B1 | 4/2002 | Breed et al. |
| RE37,709 E | 5/2002 | Dukek |
| 6,389,340 B1 | 5/2002 | Rayner |
| 6,396,403 B1 | 5/2002 | Haner |
| 6,405,112 B1 | 6/2002 | Rayner |
| 6,449,540 B1 | 9/2002 | Rayner |
| 6,452,572 B1 | 9/2002 | Fan et al. |
| 6,490,409 B1 | 12/2002 | Walker |
| 6,518,881 B2 | 2/2003 | Monroe |
| 6,525,672 B2 | 2/2003 | Chainer et al. |
| 6,546,119 B2 | 4/2003 | Ciolli et al. |
| 6,560,463 B1 | 5/2003 | Santhoff |
| 6,563,532 B1 | 5/2003 | Strub et al. |
| 6,591,242 B1 | 7/2003 | Karp et al. |
| 6,681,195 B1 | 1/2004 | Poland et al. |
| 6,690,268 B2 | 2/2004 | Schofield et al. |
| 6,697,103 B1 | 2/2004 | Fernandez et al. |
| 6,718,239 B2 | 4/2004 | Rayer |
| 6,727,816 B1 | 4/2004 | Helgeson |
| 6,748,792 B1 | 6/2004 | Freund et al. |
| 6,783,040 B2* | 8/2004 | Batchelor ............... B62J 9/008 224/406 |
| 6,823,621 B2 | 11/2004 | Gotfried |
| 6,831,556 B1 | 12/2004 | Boykin |
| 6,856,873 B2 | 2/2005 | Breed et al. |
| 6,883,694 B2 | 4/2005 | Abelow |
| 6,894,601 B1* | 5/2005 | Grunden ............... G07C 5/006 307/10.2 |
| 6,950,122 B1 | 9/2005 | Mirabile |
| 6,970,183 B1 | 11/2005 | Monroe |
| 7,012,632 B2 | 3/2006 | Freeman et al. |
| 7,034,683 B2 | 4/2006 | Ghazarian |
| D520,738 S | 5/2006 | Tarantino |
| 7,038,590 B2 | 5/2006 | Hoffman et al. |
| 7,071,969 B1 | 7/2006 | Stimson, III |
| 7,088,387 B1* | 8/2006 | Freeman ............... H04N 5/772 348/155 |
| 7,119,832 B2 | 10/2006 | Blanco et al. |
| 7,126,472 B2 | 10/2006 | Kraus et al. |
| 7,147,155 B2 | 12/2006 | Weekes |
| 7,180,407 B1 | 2/2007 | Guo et al. |
| 7,190,822 B2 | 3/2007 | Gammenthaler |
| 7,350,437 B2* | 4/2008 | Mangano ............... B62K 21/12 74/551.1 |
| 7,353,086 B2* | 4/2008 | Ennis ..................... B60R 1/00 340/937 |
| 7,363,742 B2 | 4/2008 | Nerheim |
| 7,371,021 B2 | 5/2008 | Ross et al. |
| 7,421,024 B2 | 9/2008 | Castillo |
| 7,436,143 B2 | 10/2008 | Lakshmanan et al. |
| 7,436,955 B2 | 10/2008 | Yan et al. |
| 7,448,996 B2 | 11/2008 | Khanuja et al. |
| 7,456,875 B2 | 11/2008 | Kashiwa |
| 7,496,140 B2 | 2/2009 | Winningstad et al. |
| 7,500,794 B1 | 3/2009 | Clark |
| 7,508,941 B1 | 3/2009 | O'Toole, Jr. et al. |
| 7,511,737 B2 | 3/2009 | Singh |
| 7,536,457 B2 | 5/2009 | Miller |
| 7,539,533 B2 | 5/2009 | Tran |
| 7,561,037 B1 | 7/2009 | Monroe |
| 7,594,305 B2 | 9/2009 | Moore |
| 7,602,301 B1 | 10/2009 | Stirling et al. |
| 7,656,439 B1 | 2/2010 | Manico et al. |
| 7,659,827 B2 | 2/2010 | Gunderson et al. |
| 7,680,947 B2 | 3/2010 | Nicholl et al. |
| 7,697,035 B1 | 4/2010 | Suber, III et al. |
| 7,714,704 B1* | 5/2010 | Mellen ..................... B60R 1/00 340/425.5 |
| 7,804,426 B2 | 9/2010 | Etcheson |
| 7,806,525 B2 | 10/2010 | Howell et al. |
| 7,853,944 B2 | 12/2010 | Choe |
| 7,944,676 B2 | 5/2011 | Smith et al. |
| 8,077,029 B1 | 12/2011 | Daniel et al. |
| 8,121,306 B2 | 2/2012 | Cilia et al. |
| 8,175,314 B1 | 5/2012 | Webster |
| 8,269,617 B2 | 9/2012 | Cook et al. |
| 8,314,708 B2 | 11/2012 | Gunderson et al. |
| 8,350,907 B1 | 1/2013 | Blanco et al. |
| 8,356,438 B2 | 1/2013 | Brundula et al. |
| 8,373,567 B2 | 2/2013 | Denson |
| 8,373,797 B2 | 2/2013 | Ishii et al. |
| 8,384,539 B2 | 2/2013 | Denny et al. |
| 8,446,469 B2 | 5/2013 | Blanco et al. |
| 8,456,293 B1 | 6/2013 | Trundle et al. |
| 8,503,972 B2 | 8/2013 | Haler et al. |
| 8,508,353 B2 | 8/2013 | Cook et al. |
| 8,520,069 B2 | 8/2013 | Haler |
| 8,594,485 B2 | 11/2013 | Brundula |
| 8,606,492 B1 | 12/2013 | Botnen |
| 8,676,428 B2 | 3/2014 | Richardson et al. |
| 8,690,365 B1 | 4/2014 | Williams |
| 8,707,758 B2 | 4/2014 | Keays |
| 8,725,462 B2 | 5/2014 | Jain et al. |
| 8,744,642 B2 | 6/2014 | Nemat-Nasser et al. |
| 8,780,205 B2 | 7/2014 | Boutell et al. |
| 8,781,292 B1 | 7/2014 | Ross et al. |
| 8,805,431 B2 | 8/2014 | Vasavada et al. |
| 8,849,501 B2 | 9/2014 | Cook et al. |
| 8,854,199 B2 | 10/2014 | Cook et al. |
| 8,887,208 B1 | 11/2014 | Merrit et al. |
| 8,890,954 B2 | 11/2014 | O'Donnell et al. |
| 8,896,694 B2* | 11/2014 | O'Donnell ............. G08C 17/02 348/143 |
| 8,930,072 B1 | 1/2015 | Lambert et al. |
| 8,934,045 B2 | 1/2015 | Kam et al. |
| 8,989,914 B1 | 3/2015 | Nemat-Nasser et al. |
| 8,996,234 B1 | 3/2015 | Tamari et al. |
| 8,996,240 B2 | 3/2015 | Plante |
| 9,002,313 B2 | 4/2015 | Sink et al. |
| 9,003,474 B1 | 4/2015 | Smith |
| 9,058,499 B1 | 6/2015 | Smith |
| 9,122,082 B2 | 9/2015 | Abreau |

(56) References Cited

U.S. PATENT DOCUMENTS

| | | | |
|---|---|---|---|
| 9,123,241 B2 | 9/2015 | Grigsby et al. | |
| 9,164,543 B2 | 10/2015 | Minn et al. | |
| 9,253,452 B2 | 2/2016 | Ross et al. | |
| 9,591,255 B2 | 3/2017 | Sakiewica et al. | |
| 9,728,228 B2 | 8/2017 | Palmer et al. | |
| 2001/0033661 A1* | 10/2001 | Prokoski | H04L 9/3297 380/258 |
| 2002/0013517 A1 | 1/2002 | West et al. | |
| 2002/0019696 A1 | 2/2002 | Kruse | |
| 2002/0032510 A1 | 3/2002 | Tumball et al. | |
| 2002/0044065 A1 | 4/2002 | Quist et al. | |
| 2002/0049881 A1 | 4/2002 | Sugimura | |
| 2002/0084130 A1 | 7/2002 | Der Gazarian et al. | |
| 2002/0131768 A1 | 9/2002 | Gammenthaler | |
| 2002/0135336 A1 | 9/2002 | Zhou et al. | |
| 2002/0159434 A1 | 10/2002 | Gosior et al. | |
| 2002/0191952 A1 | 12/2002 | Fiore et al. | |
| 2003/0040917 A1 | 2/2003 | Fiedler | |
| 2003/0080713 A1 | 5/2003 | Kirmuss | |
| 2003/0080878 A1 | 5/2003 | Kirmuss | |
| 2003/0081121 A1* | 5/2003 | Kirmuss | B60R 11/02 348/143 |
| 2003/0081934 A1 | 5/2003 | Kirmuss | |
| 2003/0081935 A1* | 5/2003 | Kirmuss | H04N 7/18 386/327 |
| 2003/0081942 A1 | 5/2003 | Melnyk et al. | |
| 2003/0095688 A1 | 5/2003 | Kirmuss | |
| 2003/0106917 A1 | 6/2003 | Shelter et al. | |
| 2003/0133018 A1 | 7/2003 | Ziemkowski | |
| 2003/0151510 A1 | 8/2003 | Quintana et al. | |
| 2003/0184674 A1 | 10/2003 | Manico et al. | |
| 2003/0185417 A1 | 10/2003 | Alattar et al. | |
| 2003/0215010 A1 | 11/2003 | Kashiwa | |
| 2003/0215114 A1 | 11/2003 | Kyle | |
| 2003/0222982 A1 | 12/2003 | Hamdan et al. | |
| 2004/0008255 A1 | 1/2004 | Lewellen | |
| 2004/0043765 A1 | 3/2004 | Tolhurst | |
| 2004/0143373 A1* | 7/2004 | Ennis | B60R 1/00 701/1 |
| 2004/0145457 A1 | 7/2004 | Schofield et al. | |
| 2004/0150717 A1 | 8/2004 | Page et al. | |
| 2004/0168002 A1 | 8/2004 | Accarie et al. | |
| 2004/0199785 A1 | 10/2004 | Pederson | |
| 2004/0223054 A1 | 11/2004 | Rotholtz | |
| 2004/0243734 A1 | 12/2004 | Kitagawa et al. | |
| 2004/0267419 A1 | 12/2004 | Jing | |
| 2005/0030151 A1 | 2/2005 | Singh | |
| 2005/0046583 A1 | 3/2005 | Richards | |
| 2005/0050266 A1* | 3/2005 | Haas | G06F 11/1666 711/112 |
| 2005/0068169 A1 | 3/2005 | Copley et al. | |
| 2005/0068417 A1 | 3/2005 | Kreiner et al. | |
| 2005/0083404 A1 | 4/2005 | Pierce et al. | |
| 2005/0094966 A1 | 5/2005 | Elberbaum | |
| 2005/0100329 A1 | 5/2005 | Lao et al. | |
| 2005/0101334 A1 | 5/2005 | Brown et al. | |
| 2005/0134966 A1 | 5/2005 | Burgner | |
| 2005/0132200 A1 | 6/2005 | Jaffe et al. | |
| 2005/0151852 A1 | 7/2005 | Jomppanen | |
| 2005/0035161 A1 | 8/2005 | Shioda | |
| 2005/0185438 A1 | 8/2005 | Ching | |
| 2005/0206532 A1 | 9/2005 | Lock | |
| 2005/0206741 A1* | 9/2005 | Raber | G07C 5/0891 348/211.2 |
| 2005/0228234 A1 | 10/2005 | Yang | |
| 2005/0232469 A1 | 10/2005 | Schofield et al. | |
| 2005/0243171 A1 | 11/2005 | Ross, Sr. et al. | |
| 2005/0258942 A1 | 11/2005 | Manasseh et al. | |
| 2006/0009238 A1 | 1/2006 | Stanco et al. | |
| 2006/0028811 A1 | 2/2006 | Ross, Jr. et al. | |
| 2006/0055786 A1* | 3/2006 | Ollila | H04N 5/2251 348/207.99 |
| 2006/0082730 A1 | 4/2006 | Franks | |
| 2006/0158968 A1 | 7/2006 | Vanman et al. | |
| 2006/0164220 A1 | 7/2006 | Harter, Jr. et al. | |
| 2006/0164534 A1 | 7/2006 | Robinson et al. | |
| 2006/0170770 A1 | 8/2006 | MacCarthy | |
| 2006/0176149 A1 | 8/2006 | Douglas | |
| 2006/0183505 A1 | 8/2006 | Willrich | |
| 2006/0193749 A1 | 8/2006 | Ghazarian et al. | |
| 2006/0203090 A1 | 9/2006 | Wang et al. | |
| 2006/0220826 A1 | 10/2006 | Rast | |
| 2006/0225253 A1 | 10/2006 | Bates | |
| 2006/0244601 A1 | 11/2006 | Nishimura | |
| 2006/0256822 A1 | 11/2006 | Kwong et al. | |
| 2006/0267773 A1 | 11/2006 | Roque | |
| 2006/0270465 A1 | 11/2006 | Lee et al. | |
| 2006/0271287 A1 | 11/2006 | Gold et al. | |
| 2006/0274166 A1 | 12/2006 | Lee et al. | |
| 2006/0274828 A1 | 12/2006 | Siemens et al. | |
| 2006/0276200 A1* | 12/2006 | Radhakrishnan | H04L 63/302 455/456.1 |
| 2006/0282021 A1 | 12/2006 | DeVaul et al. | |
| 2006/0287821 A1 | 12/2006 | Lin | |
| 2006/0293571 A1 | 12/2006 | Bao et al. | |
| 2007/0021134 A1 | 1/2007 | Liou | |
| 2007/0064108 A1* | 3/2007 | Haler | B60R 1/12 348/148 |
| 2007/0067079 A1 | 3/2007 | Kosugi | |
| 2007/0091557 A1 | 4/2007 | Kim et al. | |
| 2007/0102508 A1 | 5/2007 | Mcintosh | |
| 2007/0117083 A1 | 5/2007 | Winneg et al. | |
| 2007/0132567 A1 | 6/2007 | Schofield et al. | |
| 2007/0152811 A1 | 7/2007 | Anderson | |
| 2007/0172053 A1 | 7/2007 | Poirier | |
| 2007/0177023 A1 | 8/2007 | Beuhler et al. | |
| 2007/0195939 A1 | 8/2007 | Sink et al. | |
| 2007/0199076 A1 | 8/2007 | Rensin et al. | |
| 2007/0213088 A1 | 9/2007 | Sink | |
| 2007/0229350 A1 | 10/2007 | Scalisi et al. | |
| 2007/0257781 A1 | 11/2007 | Denson | |
| 2007/0257782 A1 | 11/2007 | Etcheson | |
| 2007/0257804 A1 | 11/2007 | Gunderson et al. | |
| 2007/0257815 A1 | 11/2007 | Gunderson et al. | |
| 2007/0260361 A1 | 11/2007 | Etcheson | |
| 2007/0268158 A1 | 11/2007 | Gunderson et al. | |
| 2007/0271105 A1 | 11/2007 | Gunderson et al. | |
| 2007/0274705 A1 | 11/2007 | Kashiwa | |
| 2007/0277352 A1 | 12/2007 | Maron et al. | |
| 2007/0285222 A1 | 12/2007 | Zadnikar | |
| 2007/0287425 A1 | 12/2007 | Bates | |
| 2007/0297320 A1 | 12/2007 | Brummette et al. | |
| 2008/0001735 A1 | 1/2008 | Tran | |
| 2008/0002031 A1 | 1/2008 | Cana et al. | |
| 2008/0002599 A1 | 2/2008 | Denny et al. | |
| 2008/0030580 A1 | 2/2008 | Kashhiawa et al. | |
| 2008/0042825 A1 | 2/2008 | Denny et al. | |
| 2008/0043736 A1 | 2/2008 | Stanley | |
| 2008/0049830 A1 | 2/2008 | Richardson | |
| 2008/0063252 A1 | 3/2008 | Dobbs et al. | |
| 2008/0084473 A1 | 4/2008 | Romanowich | |
| 2008/0100705 A1 | 5/2008 | Kister et al. | |
| 2008/0122603 A1 | 5/2008 | Piante et al. | |
| 2008/0129518 A1 | 6/2008 | Carlton-Foss | |
| 2008/0143481 A1 | 6/2008 | Abraham et al. | |
| 2008/0144705 A1 | 6/2008 | Rackin et al. | |
| 2008/0169929 A1 | 7/2008 | Albertson et al. | |
| 2008/0170130 A1* | 7/2008 | Ollila | H04N 5/2252 348/211.99 |
| 2008/0175565 A1 | 7/2008 | Takakura et al. | |
| 2008/0211906 A1 | 9/2008 | Lovric | |
| 2008/0222849 A1 | 9/2008 | Lavoie | |
| 2008/0239064 A1 | 10/2008 | Iwasaki | |
| 2008/0246656 A1 | 10/2008 | Ghazarian | |
| 2008/0266118 A1 | 10/2008 | Pierson et al. | |
| 2008/0307435 A1 | 12/2008 | Rehman | |
| 2008/0316314 A1 | 12/2008 | Bedell et al. | |
| 2009/0002491 A1 | 1/2009 | Haler | |
| 2009/0002556 A1 | 1/2009 | Manapragada et al. | |
| 2009/0027499 A1 | 1/2009 | Nicholl | |
| 2009/0052685 A1 | 2/2009 | Cilia et al. | |
| 2009/0070820 A1 | 3/2009 | Li | |
| 2009/0085740 A1 | 4/2009 | Klein et al. | |

(56) References Cited

U.S. PATENT DOCUMENTS

| | | | |
|---|---|---|---|
| 2009/0109292 A1 | 4/2009 | Ennis | |
| 2009/0122142 A1 | 5/2009 | Shapley | |
| 2009/0135007 A1* | 5/2009 | Donovan | G08B 13/19645 340/540 |
| 2009/0157255 A1* | 6/2009 | Plante | G06Q 10/00 701/33.4 |
| 2009/0169068 A1 | 7/2009 | Okamoto | |
| 2009/0189981 A1* | 7/2009 | Siann | H04N 7/183 348/143 |
| 2009/0195686 A1 | 8/2009 | Shintani | |
| 2009/0207252 A1 | 8/2009 | Raghunath | |
| 2009/0213204 A1 | 8/2009 | Wong | |
| 2009/0225189 A1 | 9/2009 | Morin | |
| 2009/0243794 A1 | 10/2009 | Morrow | |
| 2009/0251545 A1* | 10/2009 | Shekarri | G06Q 10/00 348/158 |
| 2009/0252486 A1 | 10/2009 | Ross, Jr. et al. | |
| 2009/0276708 A1 | 11/2009 | Smith et al. | |
| 2009/0294538 A1 | 12/2009 | Wihlborg et al. | |
| 2009/0324203 A1 | 12/2009 | Wiklof | |
| 2010/0045798 A1 | 2/2010 | Sugimoto et al. | |
| 2010/0050734 A1 | 3/2010 | Chou | |
| 2010/0060747 A1 | 3/2010 | Woodman | |
| 2010/0097221 A1 | 4/2010 | Kreiner et al. | |
| 2010/0106707 A1* | 4/2010 | Brown | G06F 16/784 707/711 |
| 2010/0118147 A1 | 5/2010 | Dorneich et al. | |
| 2010/0122435 A1 | 5/2010 | Markham | |
| 2010/0123779 A1* | 5/2010 | Snyder | G07C 5/0866 348/148 |
| 2010/0177193 A1 | 7/2010 | Flores | |
| 2010/0177891 A1 | 7/2010 | Keidar et al. | |
| 2010/0188201 A1 | 7/2010 | Cook et al. | |
| 2010/0191411 A1 | 7/2010 | Cook et al. | |
| 2010/0194885 A1* | 8/2010 | Plaster | B60R 25/10 348/148 |
| 2010/0217836 A1 | 8/2010 | Rofougaran | |
| 2010/0238009 A1 | 9/2010 | Cook et al. | |
| 2010/0238262 A1 | 9/2010 | Kurtz et al. | |
| 2010/0242076 A1 | 9/2010 | Potesta et al. | |
| 2010/0265331 A1 | 10/2010 | Tanaka | |
| 2010/0274816 A1* | 10/2010 | Guzik | G11B 27/034 707/802 |
| 2010/0287473 A1 | 11/2010 | Recesso et al. | |
| 2011/0006151 A1 | 1/2011 | Beard | |
| 2011/0018998 A1* | 1/2011 | Guzik | H04N 21/21 348/143 |
| 2011/0050904 A1 | 3/2011 | Anderson | |
| 2011/0069151 A1 | 3/2011 | Orimoto | |
| 2011/0084820 A1 | 4/2011 | Walter et al. | |
| 2011/0094003 A1 | 4/2011 | Spiewak et al. | |
| 2011/0098924 A1 | 4/2011 | Baladeta et al. | |
| 2011/0129151 A1 | 6/2011 | Saito et al. | |
| 2011/0157759 A1 | 6/2011 | Smith et al. | |
| 2011/0187895 A1* | 8/2011 | Cheng | H04N 5/228 348/231.2 |
| 2011/0261176 A1 | 10/2011 | Monaghan, Sr. et al. | |
| 2011/0281547 A1 | 11/2011 | Cordero | |
| 2011/0301971 A1 | 12/2011 | Roesch et al. | |
| 2011/0314401 A1 | 12/2011 | Salisbury et al. | |
| 2012/0038689 A1 | 2/2012 | Ishii | |
| 2012/0056722 A1 | 3/2012 | Kawaguchi | |
| 2012/0063736 A1 | 3/2012 | Simmons et al. | |
| 2012/0120258 A1 | 5/2012 | Boutell et al. | |
| 2012/0162436 A1 | 6/2012 | Cordell et al. | |
| 2012/0188345 A1 | 7/2012 | Salow | |
| 2012/0189286 A1 | 7/2012 | Takayama et al. | |
| 2012/0230540 A1* | 9/2012 | Calman | G06K 9/00221 382/103 |
| 2012/0257320 A1 | 10/2012 | Brundula et al. | |
| 2012/0268259 A1 | 10/2012 | Igel et al. | |
| 2012/0276954 A1 | 11/2012 | Kowalsky | |
| 2013/0021153 A1 | 1/2013 | Keays | |
| 2013/0033610 A1 | 2/2013 | Osborn | |
| 2013/0035602 A1 | 2/2013 | Gemer | |
| 2013/0080836 A1 | 3/2013 | Stergiou et al. | |
| 2013/0096731 A1 | 4/2013 | Tamari et al. | |
| 2013/0125000 A1* | 5/2013 | Fleischhauer | G11B 27/031 715/723 |
| 2013/0148295 A1 | 6/2013 | Minn et al. | |
| 2013/0222640 A1 | 8/2013 | Baek et al. | |
| 2013/0225309 A1 | 8/2013 | Bentley et al. | |
| 2013/0300563 A1 | 11/2013 | Glaze | |
| 2013/0343571 A1 | 12/2013 | Lee | |
| 2014/0037262 A1 | 2/2014 | Sako | |
| 2014/0049636 A1 | 2/2014 | O'Donnell et al. | |
| 2014/0092299 A1 | 4/2014 | Phillips et al. | |
| 2014/0094992 A1 | 4/2014 | Lambert et al. | |
| 2014/0098453 A1 | 4/2014 | Brundula et al. | |
| 2014/0140575 A1 | 5/2014 | Wolf | |
| 2014/0170602 A1 | 6/2014 | Reed | |
| 2014/0192194 A1 | 7/2014 | Bedell et al. | |
| 2014/0195105 A1 | 7/2014 | Lambert et al. | |
| 2014/0195272 A1 | 7/2014 | Sadiq et al. | |
| 2014/0210625 A1 | 7/2014 | Nemat-Nasser | |
| 2014/0218544 A1 | 8/2014 | Senot et al. | |
| 2014/0227671 A1 | 8/2014 | Olmstead et al. | |
| 2014/0311215 A1 | 10/2014 | Keays et al. | |
| 2014/0341532 A1 | 11/2014 | Marathe et al. | |
| 2014/0355951 A1 | 12/2014 | Tabak | |
| 2015/0050003 A1 | 2/2015 | Ross et al. | |
| 2015/0050345 A1 | 2/2015 | Smyth et al. | |
| 2015/0051502 A1 | 2/2015 | Ross | |
| 2015/0053776 A1 | 3/2015 | Rose et al. | |
| 2015/0078727 A1 | 3/2015 | Ross et al. | |
| 2015/0088335 A1 | 3/2015 | Lambert et al. | |
| 2015/0103246 A1 | 4/2015 | Phillips et al. | |
| 2015/0229630 A1 | 8/2015 | Smith | |
| 2015/0317368 A1 | 11/2015 | Rhoads et al. | |
| 2015/0332424 A1 | 11/2015 | Kane et al. | |
| 2015/0358549 A1 | 12/2015 | Cho et al. | |
| 2016/0042767 A1 | 2/2016 | Araya et al. | |
| 2016/0104508 A1 | 4/2016 | Chee et al. | |
| 2016/0127695 A1 | 5/2016 | Zhang et al. | |
| 2016/0165192 A1 | 6/2016 | Saatchi et al. | |
| 2016/0364621 A1 | 12/2016 | Hill et al. | |
| 2017/0070659 A1 | 3/2017 | Kievsky et al. | |
| 2017/0195635 A1 | 7/2017 | Yokomitsu et al. | |
| 2017/0230605 A1 | 8/2017 | Han et al. | |
| 2017/0237950 A1 | 8/2017 | Araya et al. | |
| 2017/0244884 A1 | 8/2017 | Burtey et al. | |
| 2017/0277700 A1 | 9/2017 | Davis et al. | |
| 2017/0287523 A1 | 10/2017 | Hodulik et al. | |
| 2018/0023910 A1 | 1/2018 | Kramer | |
| 2018/0050800 A1 | 2/2018 | Boykin et al. | |

FOREIGN PATENT DOCUMENTS

| | | |
|---|---|---|
| GB | 2273624 | 6/1994 |
| GB | 2320389 | 5/1998 |
| GB | 2343252 | 5/2000 |
| GB | 2351055 | 12/2000 |
| GB | 2417151 | 2/2006 |
| GB | 2425427 | 10/2006 |
| GB | 2455885 | 7/2009 |
| GB | 2485804 A | 5/2012 |
| IE | 20090923 A1 | 9/2010 |
| JP | 294188 | 9/1993 |
| JP | 153298 | 6/1996 |
| JP | 198858 | 7/1997 |
| JP | 10076880 A | 3/1998 |
| JP | 210395 | 7/1998 |
| JP | 2000137263 A | 5/2000 |
| JP | 2005119631 A | 5/2005 |
| KR | 20-0236817 | 8/2001 |
| KR | 1050897 | 7/2011 |
| RU | 2383915 C2 | 3/2010 |
| RU | 107851 U1 | 8/2011 |
| RU | 124780 U1 | 2/2013 |
| WO | 9005076 | 5/1990 |
| WO | 9738526 | 10/1997 |
| WO | 9831146 | 7/1998 |
| WO | 9948308 | 9/1999 |

(56) References Cited

FOREIGN PATENT DOCUMENTS

| WO | 0039556 | | 7/2000 | | |
| WO | 0051360 | | 8/2000 | | |
| WO | 0123214 | A1 | 4/2001 | | |
| WO | 0249881 | | 6/2002 | | |
| WO | 02095757 | | 11/2002 | | |
| WO | 03049446 | | 6/2003 | | |
| WO | 2004036926 | A2 | 4/2004 | | |
| WO | 2009013526 | A1 | 1/2009 | | |
| WO | 2011001180 | A1 | 1/2011 | | |
| WO | WO-2012037139 | A2 * | 3/2012 | ............ | G08C 17/02 |
| WO | WO 2012037139 | A2 * | 3/2012 | ............ | G08C 17/02 |
| WO | 2012120083 | A1 | 9/2012 | | |
| WO | 2014000161 | A1 | 1/2014 | | |
| WO | 2014052898 | A1 | 4/2014 | | |

OTHER PUBLICATIONS

Taser Axon Body on Officer Video/Police Body Camera, http://www.taser.com/products/on-officer-video/axon-body-on-officer-video, Sep. 23, 2013, Date Posted: Unknown, pp. 1-8.
GoPro Official Website: The World's Most Versatile Camera, http://gopro.com/products/?gclid=CKqHv9jT4rkCFWZk7AodyiAAaQ, Sep. 23, 2013, Date Posted: Unknown, pp. 4-9.
Vievu Products, http://www.vievu.com/vievu-products/vievu-squared/, Sep. 25, 2013, Date Posted: Unknown, pp. 1-2.
Digital Ally First Vu Mountable Digital Camera Video Recorder, http://www.opticsplanet.com/digital-ally-first-vu-mountable-digital-camera-video-recorder.html?gclid=CIKohcX05rkCFSIo7AodU0IA0g&ef_id=UjCGEAAAAWGEjrQF:20130925155534:s, Sep. 25, 2013, Date Posted: Unknown, pp. 1-4.
Taser AXON Flex On-Officer Video/Police Video Camera, http://www.taser.com/products/on-officer-video/taser-axon, Sep. 26, 2013, Date Posted: Unknown, pp. 1-8.
Zepcam Wearable Video Technology, http://www.zepcam.com/product.aspx, Sep. 26, 2013, Date Posted: Unknown, pp. 1-2.
Witness Cam headset, http://www.secgru.com/DVR-Witness-Cam-Headset-Video-Recorder-SG-DVR-1-COP.html, Sep. 26, 2013, Date Posted: Unknown, pp. 1-2.
SUV Cam, http://www.elmo.co.jp/suv-cam/en/product/index.html, Sep. 26, 2013, Date Posted: Unknown, p. 1.
Asian Wolf High Quality Angel Eye Body Video Spy Camera Recorder System, http://www.asianwolf.com/covert-bodycam-hq-angeleye.html, Sep. 26, 2013, Date Posted: Unknown, pp. 1-3.
Panasonic Handheld AVCCAM HD Recorder/Player, http://www.panasonic.com/business/provideo/ag-hmr10.asp, Sep. 26, 2013, Date Posted: Unknown, pp. 1-2.
POV.HD System Digital Video Camera, http://www.vio-pov.com/index.php, Sep. 26, 2013, Date Posted: Unknown, pp. 1-3.
Ecplaza HY-001HD law enforcement DVR, http://fireeye.en.ecplaza.net/law-enforcement-dvr--238185-1619696.html, Sep. 26, 2013, Date Posted: Unknown, pp. 1-3.
Edesix VideoBadge, http://www.edesix.com/edesix-products, Sep. 26, 2013, Date Posted: Unknown, pp. 1-3.
Tide Leader police body worn camera, http://tideleader.en.gongchang.com/product/14899076, Sep. 26, 2013, Date Posted: Unknown, pp. 1-3.
Stalker VUE Law Enforcement Grade Body Worn Video Camera/Recorder, http://www.stalkerradar.com/law_vue.shtml, Sep. 26, 2013, Date Posted: Unknown, pp. 1-2.
Vidmic Officer Worn Video & Radio Accessories, http://www.vidmic.com/, Sep. 26, 2013, Date Posted: Unknown, p. 1.
WatchGuard CopVu Wearable Video Camera System, http://watchguardvideo.com/copvu/overview, Sep. 26, 2013, Date Posted: Unknown, pp. 1-2.
Kustom Signals VieVu, http://www.kustomsignals.com/index.php/mvideo/vievu, Sep. 26, 2013, Date Posted: Unknown, pp. 1-4.
WolfCom 3rd Eye, X1 A/V Recorder for Police and Military, http://wolfcomusa.com/Products/Products.html, Sep. 26, 2013, Date Posted: Unknown, pp. 1-3.
RevealMedia RS3-SX high definition video recorder, http://www.revealmedia.com/buy-t166/cameras/rs3-sx.aspx, Sep. 26, 2013, Date Posted: Unknown, pp. 1-2.
Spy Chest Mini Spy Camera / Self Contained Mini camcorder / Audio & Video Recorder, http://www.spytechs.com/spy.cameras/mini-spy-camera.htm, Sep. 26, 2013, Date Posted: Unknown, pp. 1-3.
Lea-Aid Scorpion Micro Recorder Patrol kit,http://www.leacorp.com/products/SCORPION-Micro-Recorder-Patrol-kit.html, Sep. 26, 2013, Date Posted: Unknown, pp. 1-2.
MUVI portable wireless speaker with dock, http://veho-uk.fastnet.co.uk/main/shop.aspx?category=camcorder, Sep. 26, 2013, Date Posted: Unknown, p. 1.
Veho MUVI HD, http://veho-uk.fastnet.co.uk/main/shop.aspx?category=CAMMUVIHD, Sep. 26, 2013, Date Posted: Unknown, pp. 1-5.
SIV Security in Vehicle Driving Partner, http://www.siv.co.kr/, Sep. 26, 2013, Date Posted: Unknown, p. 1.
Midland XTC HD Video Camera, http://midlandradio.com/Company/xtc100-signup, Sep. 26, 2013, Date Posted: Unknown, pp. 1-3.
Drift X170, http://driftinnovation.com/support/firmware-update/x170/, Sep. 26, 2013, Date Posted: Unknown, p. 1.
UCorder Pockito Wearabel Mini Pcket Camcorder, http://www.ucorder.com/, Sep. 26, 2013, Date Posted: Unknown, p. 1.
Isaw Advance Hull HD EXtreme, www.isawcam.co.kr, Sep. 26, 2013, Date Posted: Unknown, p. 1.
Scorpion Micro DV Video Audio Recorder, http://www.leacorp.com/scorpion-micro-dv-video-audio-recorder/, Sep. 26, 2013, Date Posted: Unknown, pp. 1-3.
Taser Cam Law Enforcement Audio/Video Recorder (gun mounted), http://www.taser.com/products/on-officer-video/taser-cam, Sep. 26, 2013, Date Posted: Unknown, pp. 1-3.
Looxcie Wearable & mountable streaming video cams, http://www.looxcie.com/overview?gclid=CPbDyv6piq8CFWeFQAodlhXC-w, Sep. 26, 2013, Date Posted: Unknown, pp. 1-4.
Point of View Cameras Military & Police, http://pointofviewcameras.com/military-police, Sep. 26, 2013, Date Posted: Unknown, pp. 1-2.
Dyna Spy Inc. hidden cameras, https://www.dynaspy.com/hidden-cameras/spy-cameras/body-worn-wearable-spy-cameras, Sep. 26, 2013, Date Posted: Unknown, pp. 1-3.
Amazon.com wearable camcorders, http://www.amazon.com/s/ref=nb_sb_ss_i_0_4?url=search-alias%3Dphoto&field-keywords=wearable+camcorder&x=0&y=0&sprefix=wear, Sep. 26, 2013, Date Posted: Unknown, pp. 1-4.
Automation Systems Article, Know-How Bank Co. Ltd. Takes Leap Forward as a Company Specializing in R&D and Technology Consulting, published Jan. 2005.
Car Rear View Camera—Multimedia Rear View Mirror—4' LCD color monitor, Retrieved from the Internet: <URL: http://web.archive.org/web/20050209014751/http://laipac.com/multimedia-rear-mirror.htm>, Feb. 9, 2005.
ATC Chameleon. Techdad Review [Online] Jun. 19, 2013 [Retrieved on Dec. 30, 2015]. Retrieved from Internet. <URL:http://www.techdadreview.com/2013/06/19atc-chameleon/>.
"Breathalyzer." Wikipedia. Printed Date: Oct. 16, 2014; Date Page Last Modified: Sep. 14, 2014; <http://en.wikipedia.org/wiki/Breathalyzer>.
Dees, Tim; Taser Axon Flex: The next generation of body camera; <http://www.policeone.com/police-products/body-cameras/articles/527231- 0-TASER-Axon-Flex-The-next-generation-of-body-camera/>, Date Posted: Mar. 12, 2012; Date Printed: Oct. 27, 2015.
Brown, TP-LINK TL-WDR3500 Wireless N600 Router Review, Mar. 6, 2013.
Controller Area Network (CAN) Overview, National Instruments White Paper, Aug. 1, 2014.
Daskam, Samuel W., Law Enforcement Armed Robbery Alarm System Utilizing Recorded Voice Addresses Via Police Radio Channels, Source: Univ. of Ky, Off of Res and Eng., Sery (UKY BU107), pp. 18-22, 1975.
*Digital Ally* vs. *Taser International, Inc.*, Case No. 2:16-cv-232 (CJM/TJ); US D. Kan, Defendant Taser International Inc.'s Preliminary Invalidity Contentions, Jul. 5, 2016.
Electronic Times Article, published Feb. 24, 2005.

(56) References Cited

OTHER PUBLICATIONS

Supplementary European Search Report dated Sep. 28, 2010 in European Patent Application No. 06803645.8; Applicant: Digital Ally, Inc.
W. Fincham, Data Recorders for Accident Investigation, Monitoring of Driver and Vehicle Performance (Digest No. 1997/122), Publication Date: Apr. 10, 1997, pp. 6/1-6/3.
Frankel, Harry; Riter, Stephen, Bernat, Andrew, Automated Imaging System for Border Control, Source: University of Kentucky, Office of Engineering Services, (Bulletin) UKY BU, pp. 169-173, Aug. 1986.
Freudenrich, Craig, Ph.D.; "How Breathalyzers Work—Why Test?." HowStuffWorks. Printed Date: Oct. 16, 2014; Posted Date: Unknown; <http://electronics.howstuffworks.com/gadgets/automotive/breathalyzer1.htm>.
Hankyung Auto News Article, Know-How Bank's Black Box for Cars "Multi-Black Box," Copyright 2005.
Guide to Bluetooth Security: Recommendations of the National Institute of Standards and Technology, National Institute of Standards and Technology, U.S. Dep't of Commerce, NIST Special Publication 800-121, Revision 1 (Jun. 2012).
ICOP Extreme Wireless Mic, Operation Supplement, Copyright 2008.
ICOP Model 20/20-W Specifications; Enhanced Digital In-Car Video and Audio recording Systems, date: Unknown.
ICOP Mobile DVRS; ICOP Model 20/20-W & ICOP 20/20 Vision, date: Unknown.
Bertomen, Lindsey J., PoliceOne.com News; "Product Review: ICOP Model 20/20-W," May 19, 2009.
ICOP Raytheon JPS communications, Raytheon Model 20/20-W, Raytheon 20/20 Vision Digital In-Car Video Systems, date: Unknown.
Overview of the IEEE 802.15.4 standards for Low rate Wireless Personal Area Networks, 2010 7th International Symposium on Wireless Communication Systems (ISWCS), Copyright 2010.
Lewis, S.R., Future System Specifications for Traffic Enforcement Equipment, S.R. 1 Source: IEE Colloquium (Digest), N 252, Publication Date: Nov. 18, 1996, pp. 8/1-8/2.
Kopin Corporation; Home Page; Printed Date: Oct. 16, 2014; Posted Date: Unknown; <http://www.kopin.com>.
Translation of Korean Patent No. 10-1050897, published Jul. 20, 2011.
Lilliput RV 18-50NP 5" Rear View Mirror TFT LCD Screen with Camera, Retrieved from the Internet: <URL: http://www.case-mod.com/lilliput-rv1850np-rear-view-mirror-tft-lcd-screen-with-camera-p-1271.html>, Mar. 4, 2005.
Motor Magazine Article, Recreating the Scene of an Accident, published 2005.
New Rearview-Mirror-Based Camera Display Takes the Guesswork Out of Backing Up Retrieved from the Internet: <URL: httb://news.thomasnet.com/fullstory/497750>, Press Release, Oct. 30, 2006.
SIIF Award for Multi Black Box, published Dec. 10, 2004.
Near Field Communication; Sony Corporation; pp. 1-7, Date: Unknown.
Oregon Scientific ATC Chameleon Dual Lens HD Action Camera, http://www.oregonscientificstore.com/Oregon-Scientific-ATC-Chameleon-Dual-Lens-HD-Action-Camera.data, Date Posted: Unknown; Date Printed: Oct. 13, 2014, pp. 1-4.
U.S. Appl. No. 13/959,142 Final Office Action dated Jul. 20, 2016.
U..S Appl. No. 13/959,142 Office Action dated Nov. 3, 2015.
Notification of Transmittal of the International Search Report and the Written Opinion of the International Search Authority, or the Declaration dated Jan. 14, 2016, International Application No. PCT/US2015/056039; International Filing date Oct. 16, 2015, Applicant: Digital Ally, Inc.

Notification of Transmittal of the International Search Report and the Written Opinion of the International Searching Authority or the Declaration dated Feb. 4, 2016; International Application No. PCT/US2015/056052; International Filing Date: Oct. 16, 2015; Applicant: Digital Ally, Inc.
http://www.k-h-b.com/board/board.php?board=products01&comand=body&no=1, Current State of Technology Held by the Company, Copyright 2005.
City of Pomona Request for Proposals for Mobile Video Recording System for Police Vehicles, dated prior to Apr. 4, 2013.
http://www.k-h-b.com/sub1_02.html, Copyright 2005.
Renstrom, Joell; "Tiny 3D Projectors Allow You to Transmit Holograms From a Cell Phone." Giant Freakin Robot. Printed Date: Oct. 16, 2014; Posted Date: Jun. 13, 2014; <http://www.giantfreakinrobot.com/sci/coming-3d-projectors-transmit-holograms-cell-phone.html>.
Request for Comment 1323 of the Internet Engineering Task Force, TCP Extensions for High Performance, Date: May 1992.
"Stalker Press Room—Using In-Car Video, the Internet, and the Cloud to keep police officers safe is the subject of CopTrax live, free webinar." Stalker. Printed Date: Oct. 16, 2014; Posted Date: Jul. 31, 2014.
State of Utah Invitation to Bid State Cooperative Contract; Vendor: ICOP Digital, Inc., Contract No. MA503, Jul. 1, 2008.
Wasson, Brian; "Digital Eyewear for Law Enforcement." Printed Date: Oct. 16, 2014; Posted Date: Dec. 9, 2013; <http://www.wassom.com/digital-eyewear-for-law-enforcement.html>.
X26 Taser, Date Unknown.
Taser International; Taser X26 Specification Sheet, 2003.
International Association of Chiefs of Police Digital Video System Minimum Specifications; Nov. 21, 2008.
Petition for Inter Partes Review No. 2017-00375, *Taser International, Inc.* v. *Digital Ally, Inc.*, filed Dec. 1, 2013.
Petition for Inter Partes Review No. 2017-00376, *Taser International, Inc.* v. *Digital Ally, Inc.*, filed Dec. 1, 2013.
Petition for Inter Partes Review No. 2017-00515, *Taser International, Inc.* v. *Digital Ally Inc.*, filed Jan. 11, 2017.
PCT Patent Application PCT/US16/34345 International Search Report and Written Opinion dated Dec. 29, 2016.
*Digital Ally, Inc.* vs. *Taser International, Inc.*, Case No. 2:16-cv-020232 (CJM/TJ); US D. Kan, Complaint for Patent Infringement, Jan. 14, 2016.
*Digital Ally, Inc.* vs. *Enforcement video LLC d/b/a Watchguard Video.*, Case No. 2:16-cv-02349 (CJM/TJ); US D. Kan, Complaint for Patent Infringement, May 27, 2016.
State of Utah Invitation to Bid State Cooperative Contract; Vendor: Kustom Signals Inc., Contract No. MA1991, Apr. 25, 2008.
Petition for Inter Partes Review No. 2017-00775, *Taser International, Inc.* v. *Digital Ally Inc.*, filed Jan. 25, 2017.
PCT Patent Application PCT/US17/16383 International Search Report and Written Opinion dated May 4, 2017.
European Patent Application 15850436.6 Search Report dated May 4, 2018.
Invalidity Chart for International Publication No. WO2014/000161 Oct. 31, 2017.
Petition for Post Grant Review No. PGR2018-00052, *Axon Enterprise, Inc.* v. *Digital Ally, Inc.*, filed Mar. 19, 2018.
MPEG-4 Coding of Moving Pictures and Audio ISO/IEC JTC1/SC29/WG11 N4668 dated Mar. 2002.
Final Written Decision for Inter Partes Review No. 2017-00375, *Axon Enterprise Inc.* v. *Digital Ally, Inc.*, issued Jun. 1, 2018.
Decision Denying Institution of Post Grant Review for Post Grant Review No. PGR2018-00052, *Axon Enterprise, Inc.* v. *Digital Ally, Inc.*, issued Oct. 1, 2018.

\* cited by examiner

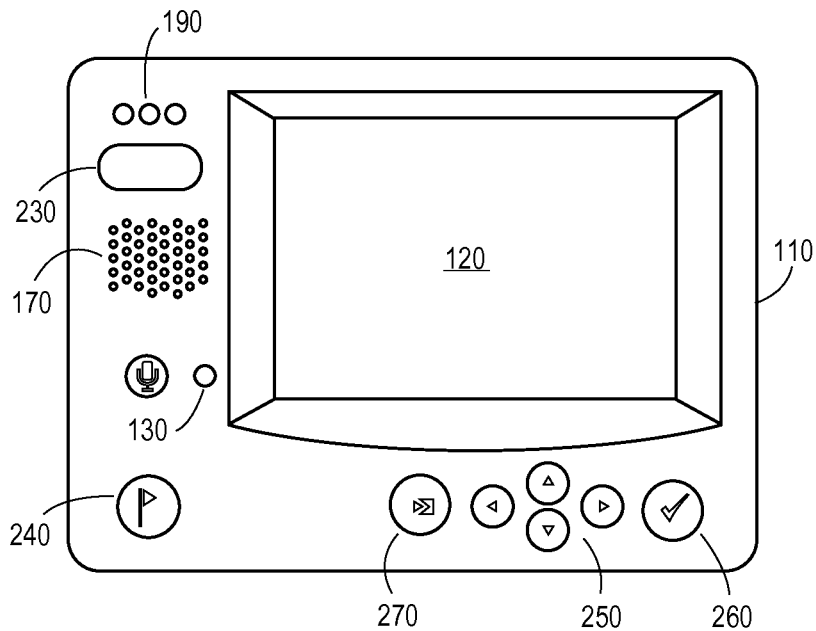
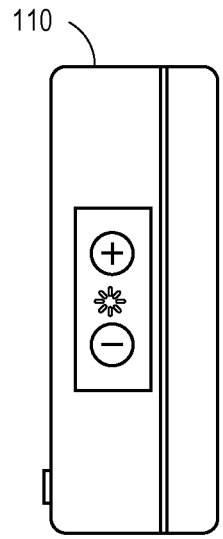
FIG. 5    FIG. 6
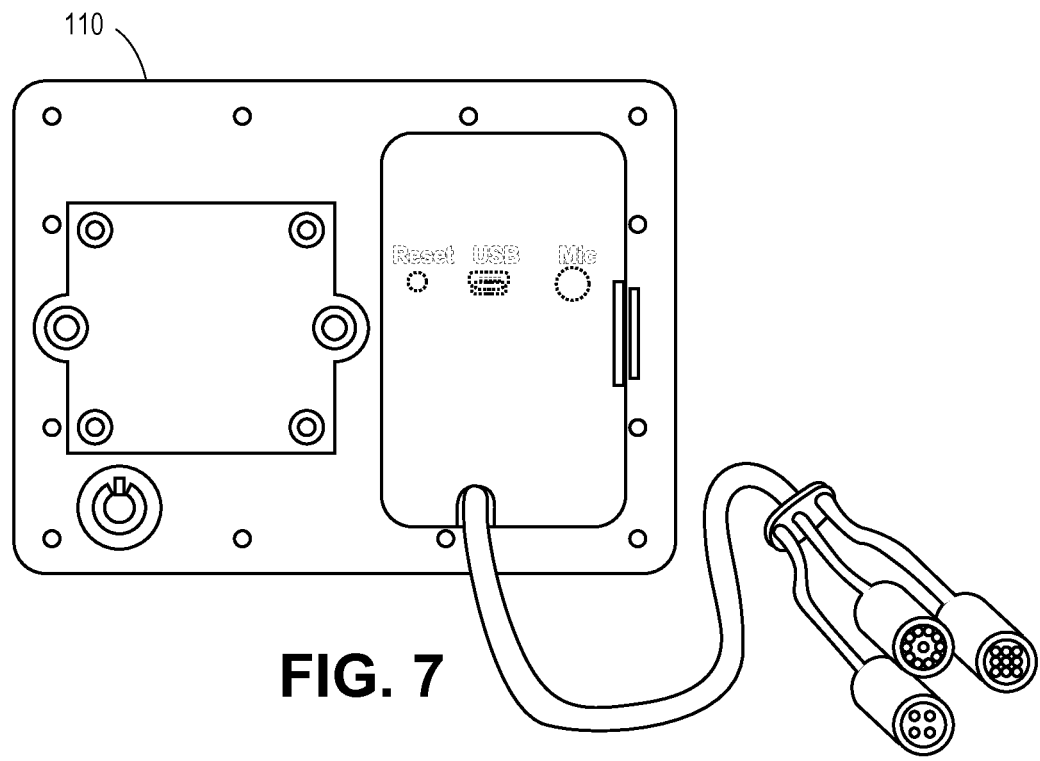
FIG. 7

MOBILE VIDEO AND IMAGING SYSTEM

RELATED APPLICATIONS

This non-provisional patent application claims priority benefit, with regard to all common subject matter, of earlier-filed U.S. Provisional Patent Application No. 61/707,326, filed Sep. 28, 2012, and entitled "MOBILE VIDEO AND IMAGING SYSTEM," and U.S. Provisional Patent Application No. 61/707,348, filed Sep. 28, 2012, and entitled "PORTABLE VIDEO AND IMAGING SYSTEM." The identified earlier-filed provisional patent applications are hereby incorporated by reference in their entirety into the present application.

FIELD

Embodiments of the invention are directed to non-enclosed-vehicle mounted systems for recording video and audio. More particularly, embodiments are directed to a portable, all-weather, non-enclosed-vehicle mounted video systems for use as an evidence gathering tool in a mobile video surveillance system.

BACKGROUND

Many law enforcement vehicles include video systems for recording and displaying activity in and around the vehicle. For alternative forms of non-enclosed motorized vehicles, such as motorcycles, EVs and security carts, ATVs, and boats and other watercraft, the lack of protection from the debris and constant exposure of the elements does not allow for the integration of sophisticated video systems. Moreover, enclosed-vehicle video systems are expensive, bulky, and difficult to operate and maintain. It is also generally difficult to find sufficient space for the camera, recording system, and monitor in enclosed vehicles. In non-enclosed vehicles, finding space for such equipment is even more difficult. In enclosed vehicles, it is possible to store certain components, such as a recording system, in the trunk of the vehicle. However, storing bulky objects in a trunk is not always an option with non-enclosed vehicles. Additionally, many current systems are limited to simply recording and displaying visual images of the activity and do not provide any additional information associated with the activity.

SUMMARY

Embodiments of the invention overcome the above-identified and other problems by providing a portable, all-weather, non-enclosed-vehicle mounted video system, primarily contained within a single weatherproof enclosure that is capable of recording, storing, and replaying video images, and further comprising an interface for connecting external components.

In one embodiment, the video system for the vehicle broadly comprises at least one connector for connecting to an external camera. In another embodiment, the video system broadly comprises at least one connector for connecting to a wireless microphone base station. In various implementations, the video system may allow for capturing audio signals and other desirable information, including, for example, data captured by external components and communicated to the system.

In one embodiment, the video system may comprise various components mounted in or on the console housing, including a video display or monitor, an internal camera, an electronics module, a memory, an internal microphone, a speaker, a plurality of input buttons, one or more LED indicators, input connectors, and output connectors. The system also may include one or more external cameras in communication with the electronics module via a specialized or general purpose connector. One or more additional external components may be connected to the console housing via the input connectors such as, for example, a GPS antenna or a speed detector.

In various implementations, the video system may further include any one or more of the following features. The external or internal video camera may be synchronized with the video system so as to provide an accurate time stamp associated with the video. The video camera may be operable to implement a pre-event recording loop. The video camera and video system may be connected by a high speed bus. There may be one or more video cameras connected to the video system. The system may include a microphone operable to capture and encode audio.

Embodiments of the system may include a portable, mountable housing and the display monitor integrated into the housing. Other embodiments of the system may include a location-determining device operable to determine a location of the vehicle when the video is captured and a recording medium operable to record at least a portion of the captured video and the location of the vehicle when the video was captured.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of embodiments of the invention will be apparent from the following detailed description of the embodiments and the accompanying drawing figures.

BRIEF DESCRIPTION OF THE DRAWINGS

Further features of embodiments of the invention will become apparent to those skilled in the art to which embodiments of the invention relates from reading the following description with reference to the accompanying drawings, in which:

FIG. 5 is a front elevation view of the video system of FIG. 1;

FIG. 6 is a side elevation view of the video system of FIG. 1;

FIG. 7 is a rear elevation view of the video system of FIG. 1; and

DETAILED DESCRIPTION

Figure 1:
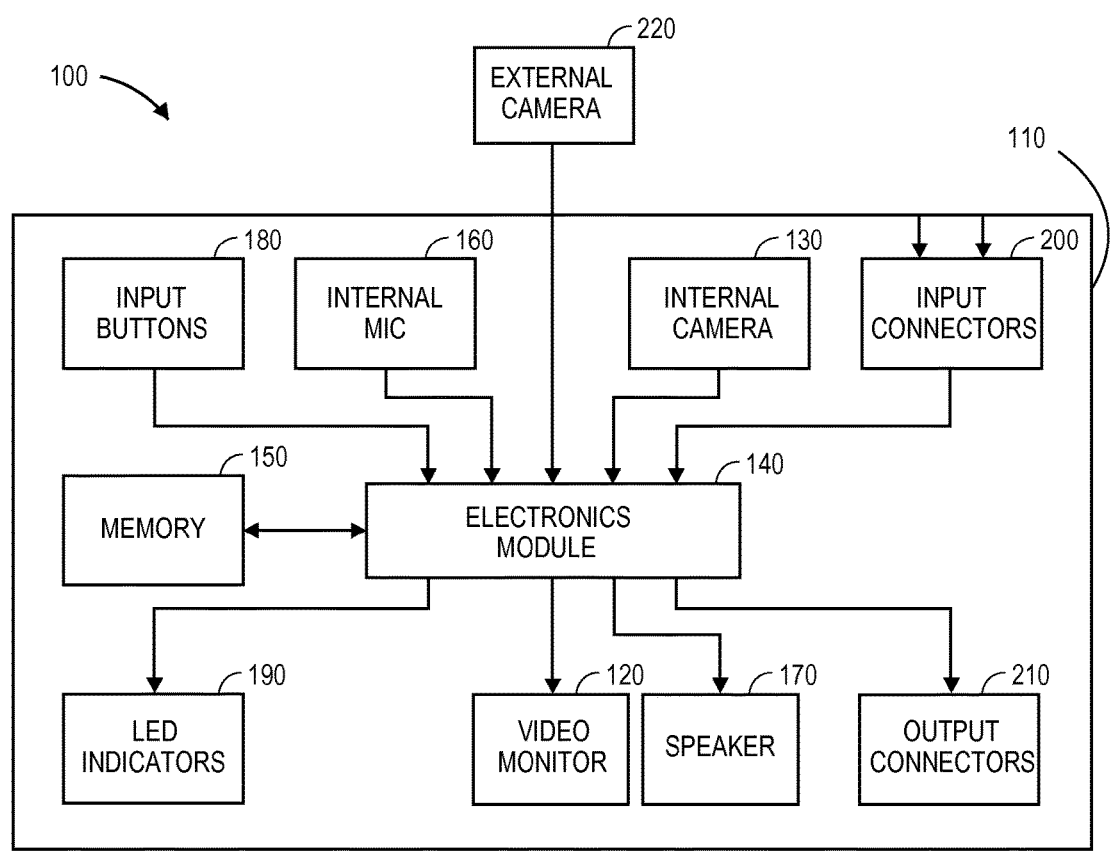
FIG. 1 is a functional block diagram of a video system according to one embodiment of the invention.

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Features and components of embodiments of the invention may be, in some respects, similar to features and components described in U.S. application Ser. No. 14/040,329, filed Sep. 27, 2013, claiming priority to U.S. Provisional Patent Application No. 61/707,348, filed Sep. 28, 2012, and entitled "PORTABLE VIDEO AND IMAGING SYSTEM" (identified above in the Related Applications section), and owned by the assignee of the present application. The referenced non-provisional application filed concurrently herewith and claiming priority to the '348 Provisional Application is incorporated by reference herein in its entirety. Additionally, the following patent and patent application, both of which are owned by the assignee of the present application, are incorporated by reference herein in their entirety: U.S. Pat. No. 8,520,069, issued Aug. 27, 2013, and entitled "VEHICLE-MOUNTED VIDEO SYSTEM WITH DISTRIBUTED PROCESSING; and U.S. patent application Ser. No. 13/967,151, filed Aug. 14, 2013, entitled "COMPUTER PROGRAM, METHOD, AND SYSTEM FOR MANAGING MULTIPLE DATA RECORDING DEVICES."

With reference to the figures, a video system is herein described, shown, and otherwise disclosed in accordance with embodiments of the invention. More specifically, embodiments of the invention provide for a portable, all-weather vehicle-mounted video system that is capable of recording, storing, and replaying video images, wherein the video system includes at least one connector for connecting to an external camera. The video system may include a memory, an electronics module, input buttons, and a display monitor, with all components being integrated into a weatherproof console housing. The video system may also allow for capturing audio signals and other desirable information, including, for example, data captured by external components and communicated to the system.

Referring to FIG. 1, an embodiment of the video system 100 is shown broadly comprising various components mounted in or on the console housing 110, including a video display or monitor 120, an internal camera 130, an electronics module 140, a memory 150, an internal microphone 160, a speaker 170, a plurality of input buttons 180, one or more LED indicators 190, input connectors 200, and output connectors 210. The system 100 also may include one or more external cameras 220 in communication with the electronics module 140 via a specialized or general purpose connector. One or more additional external components (not illustrated) may be connected to the console housing 110 via the input connectors 200 such as, for example, a GPS antenna, a wireless microphone base station, an external triggering event detector, or a speed detector.

In some embodiments, the internal camera 130 may be positioned on the console housing 110 such that it is either forward facing (See FIG. 2) or rear facing. The internal camera 130 may be mounted at an angle, such as approximately between 10 degrees and 90 degrees to the left or to the right, so that the camera is able to properly view an area directly behind or in front of the console even when the console is angled towards the user during normal use, such as where the console is mounted on a vehicle windshield or motorcycle handles and angled toward the user. One appropriate camera for use as the internal camera is a 640×480 (VGA) sensor, 0.01 Lux sensitivity, and a 140 degree 4-element coated glass lens.

Figure 3:
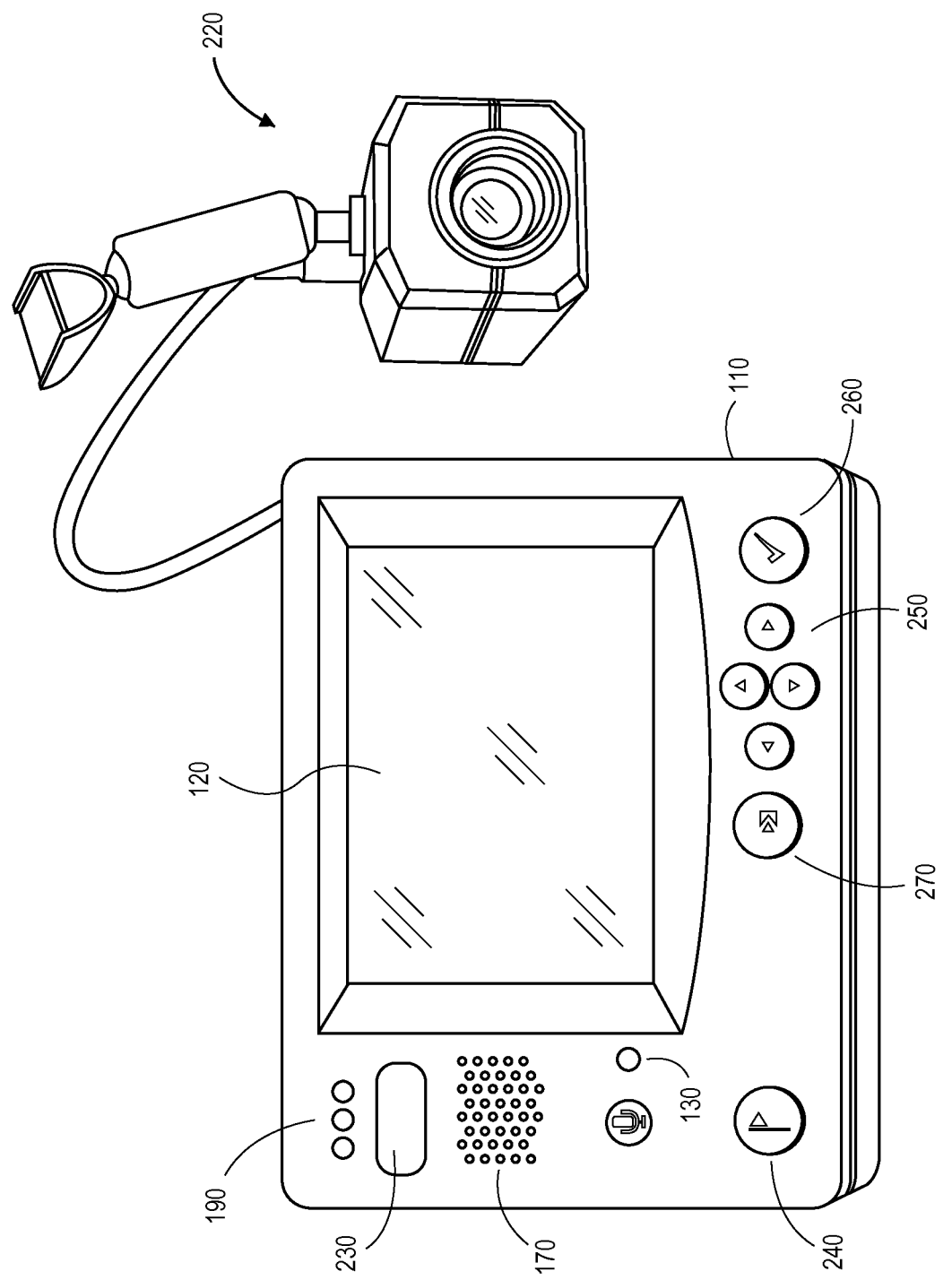
FIG. 3 is a perspective view of a video system constructed according to an embodiment of the invention and illustrating an active monitor showing the image from a forward facing external camera mounted in close proximity.
Figure 4:
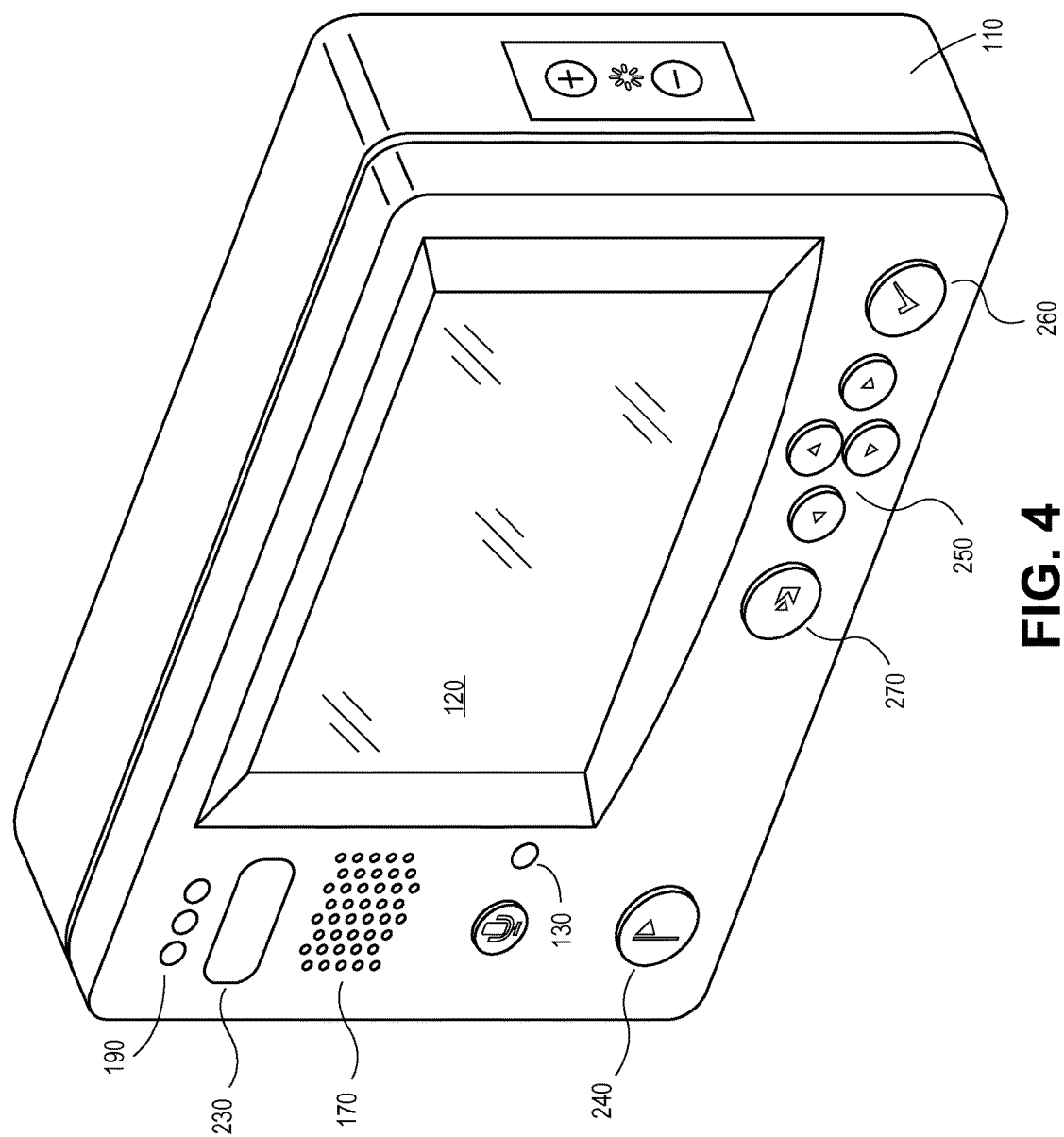
FIG. 4 is a perspective view of the video system of FIG. 1.
Figure 8:
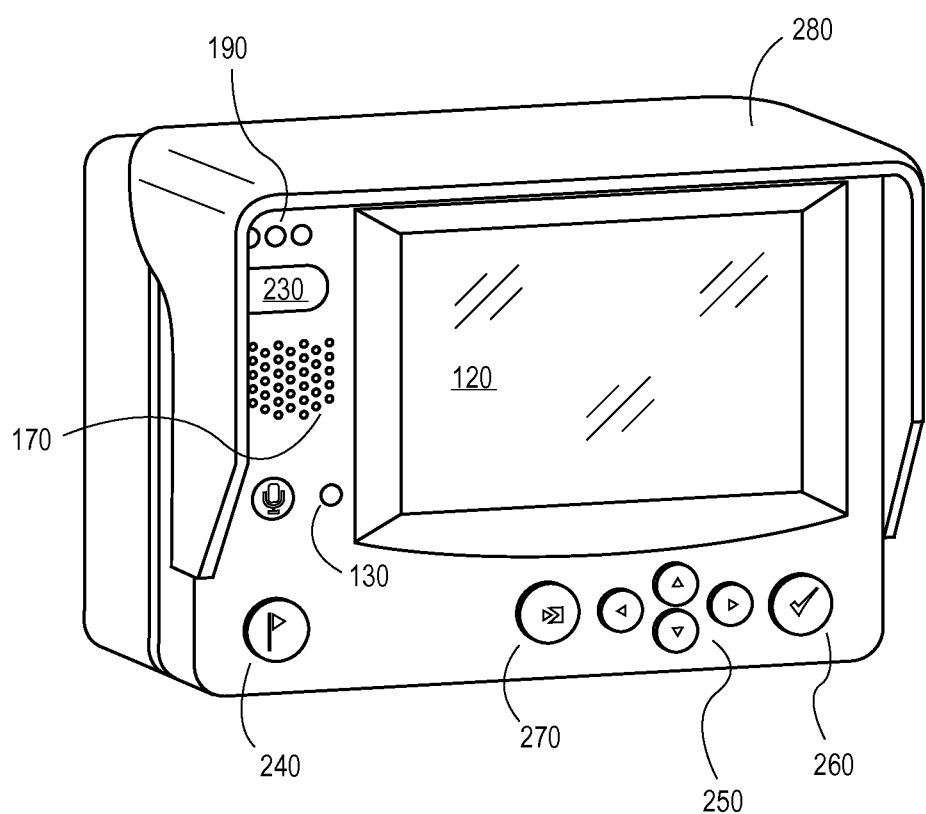
FIG. 8 is a perspective view of a video system constructed according to another embodiment of the invention.

In some embodiments, the external camera 220 is mounted outside of the console housing 110 in a separate enclosure (see FIG. 3). In other embodiments, the external camera 220 is enclosed in a separate weatherproof housing, with weatherproof connections to the console housing 110. One appropriate camera for use as the external camera 220 is a color CCD sensor NTSC with 768×484 pixels and 470 lines of resolution, a 10× optical zoom and auto focus capabilities, a wide viewing angle that is from 50.7 to 5.4 degrees, and standard and low light modes. In one embodiment, the external camera 220 is mounted near the front wheels of a motorcycle or ATV. In other embodiments, the external camera is mounted near the front forks of the vehicle. In alternative embodiments, the external camera is mounted onto the chassis or non-moving structure rigidly attached to the vehicle. In one embodiment, the external camera 220 may include one or more mounting elements for mounting on a vehicle. Mounting elements may be configured to mount on a vehicle chassis, forks, handlebars, fairings, or other rigidly attached portions of the vehicle. Other embodiments of the mounting elements may comprise grip mounts, ball mounts, suction mounts, fixed mounts, screw mounts, ventilation mounts, brackets, magnets, hinges, or any combination or variation of the elements listed herein. While a single external camera 220 is illustrated in the attached drawing, the invention is not so limited. Multiple external cameras may be used without departing from the scope of the invention.

The display monitor 120 may be mounted or integrated into the console housing 110. Embodiments may provide that the integrated display is sealed, weather proof, or waterproof, so that moisture cannot infiltrate the console housing. In some embodiments, the display monitor 120 may be operable to automatically turn off when the vehicle begins to move or when the vehicle's transmission is shifted into reverse or drive, so that the driver is not distracted while the vehicle is in motion. One appropriate monitor for use as the video monitor 120 is a 3.5 inch diagonal, 640×480 TFT LCD monitor. Other embodiments may use a variety of monitor technologies, including high definition, standard definition, color, black and white, touch screen, capacitive screens, plasma displays, LED displays, and other display variations and sizes.

In one embodiment, the electronics module 140 includes a number of electronic components, including components for receiving video signals from the video cameras 130,220 and for transmitting video signals to the monitor 120. In some embodiments, the electronics module 140 also includes components operable to receive and execute instructions stored in internal memory 150. In one embodiment, for example, these instructions include menu instructions for setting operational modes and resolutions. These instructions may be updated by loading instructions into a memory card and then inserting that card into a port in the system 100. Other embodiments may allow for updates of instructions on internal memory or removable memory via wireless connections and/or via one of the input connectors. In various embodiments, the electronics module may include components for manual data entry and system configuration from a user by providing a user interface with input buttons 180 and a graphical user interface displayed on the monitor 120.

In one embodiment, the input and output connectors 200, 210 are connected to the module 140 for receiving electronic signals (or "instructions") thereto and transmitting electronic signals (or "instructions") therefrom. In some embodiments, the input and/or output connectors may be in the form of cable pigtails, proprietary ports, RCA ports, stereo ports, USB ports, and other various system interface connectors. The input connectors 200 may include, for example, connectors for the external camera 220, power input, an external microphone, and other accessories. The input connectors 200 may also include one or more connectors for receiving signals to trigger (or "activate") operation of the system. Examples of a triggering event may include, for example, turning on the vehicle's siren and/or signal lights, an accelerometer measurement outside a pre-established norm, a position of the vehicle and/or officer as measured by a GPS, a vehicle crash event or the police vehicle attaining a threshold speed (e.g., 80 m.p.h.), etc. In embodiments, the electronics module 140 may receive a signal from, for example, the vehicle indicative of a triggering event. In response to receipt of the signal, or based on a type of triggering event as evidenced by the signal, the electronics module 140 may begin recording. As an exemplary scenario, the electronics module 140 may receive a signal identifying a triggering event of the police officer being more than twenty feet from the vehicle. Upon receipt of the signal, the electronics module 140 begins recording. Some embodiments may be configured so that an external component, such as a wireless microphone charging cradle, is also operable to detect triggering events and to send the triggering signal to the electronics module 140 for handling. In certain embodiments, a wireless microphone is operable to transmit a triggering event to its charging cradle for the direct transmission of the triggering event to the electronics module 140. It should be appreciated that other types of triggering events and exemplary scenarios can be employed.

The input connectors 200 may also include a port, such as a USB 2.0 or 3.0 port, to allow for directly accessing the memory using a laptop or other computer. In some embodiments, some or all of the input and/or output connectors may be exposed on the housing. Other embodiments may enclose the input and/or output connectors with a housing door or weatherproofing cover. The output connectors 210 may include, for example, an audio/visual connector for transmitting audio/visual signals to an external monitor or recording device. Additionally or alternatively, any one or more of these physical connectors may be replaced with wireless communication technology allowing the system to wirelessly receive or transmit any of the aforementioned input or outputs. Wireless communication technology may operate via communications networks such as Internet, Wi-Fi links, radio-frequency ("RF") links, Bluetooth technology, infrared (IR), Near Field Communication (NFC) technology, or long and short wave radio. In some embodiments, base components associated with wireless communication technology, such as an antenna or wireless card, may be integrated with the electronics module 140 or simply enclosed inside of the housing 110.

In some embodiments, the module 140 may also include components for receiving audio signals from audio sources, such as the internal microphone 160, an external microphone, and for transmitting audio signals to the speaker 170. The module 140 may also include components for receiving wireless signals from one or more remote microphones, such as a wireless microphone worn by a user. In this case, the module may include an integrated 900 MHz (or another suitable frequency allowed by law), spread spectrum, dual receiver capable remote microphone system with a nominal range of up to approximately 1000 feet or greater (a range of several miles may be achieved under the proper conditions). Control signals or triggering events may be also be communicated from a remote microphone to the electronics module, such as a signal to begin video recording. Wireless signals may be transmitted via communications networks such as Internet, Wi-Fi links, radio-frequency ("RF") links, Bluetooth technology, infrared (IR), Near Field Communication (NFC) technology, or long and short wave radio. Embodiments may keep all associated base components for wireless communications enclosed within the housing 110.

In other embodiments, the module 140 may also include an integrated GPS receiver connected to the GPS antenna. Utilizing the information provided by these components, the module 140 may mark recorded video with real-time position data. The system may include a "dead reckoning" function that works with GPS to allow for operation in shielded locations, such as underground garages. Some embodiments may communicate directly with the GPS receiver so that GPS coordinates stored in video event metadata may be automatically updated upon the automatic or manual marking or flagging of a video event.

In one embodiment, the memory 150 is in communication with the electronics module 140 for receiving and storing the video, audio, and other data. One appropriate form of electronic memory for use as the memory is a CF card form factor removable memory module, and one appropriate format for storing the data is MPEG 4 format. Other appropriate forms of electronic memory for use as the memory 150 include micro hard drives, laptop-type hard drives, and flash memory cards. Embodiments of the invention may use a built-in internal solid state memory or a removable form of solid state memory for prevention of data loss due to road vibrations. As will be understood by those in the field, the amount of data storable in the memory is dependent, at least in part, on the resolution utilized by the electronics module 140. It is contemplated, however, that the memory 150 may store approximately one hour of data per gigabyte of memory per simultaneous camera for high resolution, approximately two hours of data per gigabyte of memory per simultaneous camera for medium resolution, and approximately four hours of data per gigabyte of memory per simultaneous camera for low resolution. Other embodiments may allow for a memory redundancy feature, wherein a plurality of memory is used to provide backup or redundancy in data in the event of a memory failure in at least one of the memory modules. Configurations for memory redundancy may entail any combination or plurality of a fixed internal memory, internally stored removable memories, USB flash drives, wireless storage devices, or hard-wired external storage devices.

Referring also to FIGS. 2-8, the input buttons 180 may be mounted or integrated on the console housing 110 and are operable for communicating inputs to the electronics module for controlling various operations, components, and functions of the system 100. In one embodiment, the buttons 180 may include and operate as follows. A record button 230 may trigger recording in one of several recording modes, such as various night and day recording modes. Day and night recording modes may be set automatically using information from an on-board real-time clock or from a light sensor or from the camera 130. One or more visual indicators, such as LEDs 190, on the front and/or the back of the unit may be activated when the system 100 is recording. A flag button 240 may place a bookmark in the video to mark the location of significant events in a video sequence. A series of arrow buttons 250 may scroll through settings such as Video Monitor and Control illumination/indicators ON, Video Monitor OFF, Control illumination/indicators ON, and Video Monitor and Control illumination OFF. A menu button 260 may toggle the menu display on the monitor 120 and turns the monitor ON if the display is OFF. The menu display generally functions as a user interface, wherein a user is capable of configuring various functions of the system 100 by using the input buttons 180. The arrow buttons 250 may allow for scrolling through various functions of the user interface. In some embodiments, a virtual keyboard may be presented to the user and the arrow buttons may allow for the selection of characters to be entered for a particular function. A play button 270 may toggle between play and pause in video playback mode. Other embodiments may provide for a menu display that allows for a secure login, wherein the user is required to enter a PIN or password to access various features of the video system. Another embodiment may provide for a menu display for image and/or video playback. An additional embodiment may provide for a menu display that provides the user with the ability to manually modify (i.e., create, edit, or delete) event metadata on the system display 120 by using the input buttons 180.

Embodiments of the invention may allow for the on-site modification of event metadata for categorizing, labeling, or quantifying details of video events. In one embodiment, the manual on-site modification of event metadata may be facilitated through the use of the integrated input buttons 180 that are operable to communicate inputs to the electronics module 140. The electronics module 140 is operable to modify the metadata related to a particular video event stored in the memory 150. Event metadata may include data fields such as time, date, location, age, event type, ethnicity of involved subject, vehicle identifying information, and other forms of event detail identifying metadata. In some embodiments, event metadata such as time, date, and location may be automatically created by the system 100. For example, a GPS component may automatically send GPS coordinates to the electronics module for creating event metadata when queried by the electronics module by a triggering event, flag/bookmark command, or a current location query. In certain embodiments, automatically entered metadata may not be editable by the user to ensure validity of the forensic information (i.e. video and audio) captured by the system. Other forms of event metadata may be easily created or modified by the user when categorized by metadata type, for example, event type, event ethnicity, event age, and other event identifying descriptors. Other embodiments may further break down metadata categories by listing detailed descriptors within the metadata categories. In a non-limiting example, an event type category may be sub-categorized by a law enforcement officer as a "traffic stop", "DUI", "accident", or "pursuit". In this non-limiting example, the law enforcement officer can categorize his/her videos "on site" or "in the field" for facilitating the organization of multiple video events. Even further embodiments may allow for the manual text entry of metadata by selecting characters with the input buttons 180 to navigate a virtual keyboard displayed to the user. As used herein, input or inputs may be the press of a button or key, virtual button (including invisible or hidden virtual buttons), a swipe, gesture, motion, sound, spoken word, or any combination or plurality of the above inputs.

Figure 2:
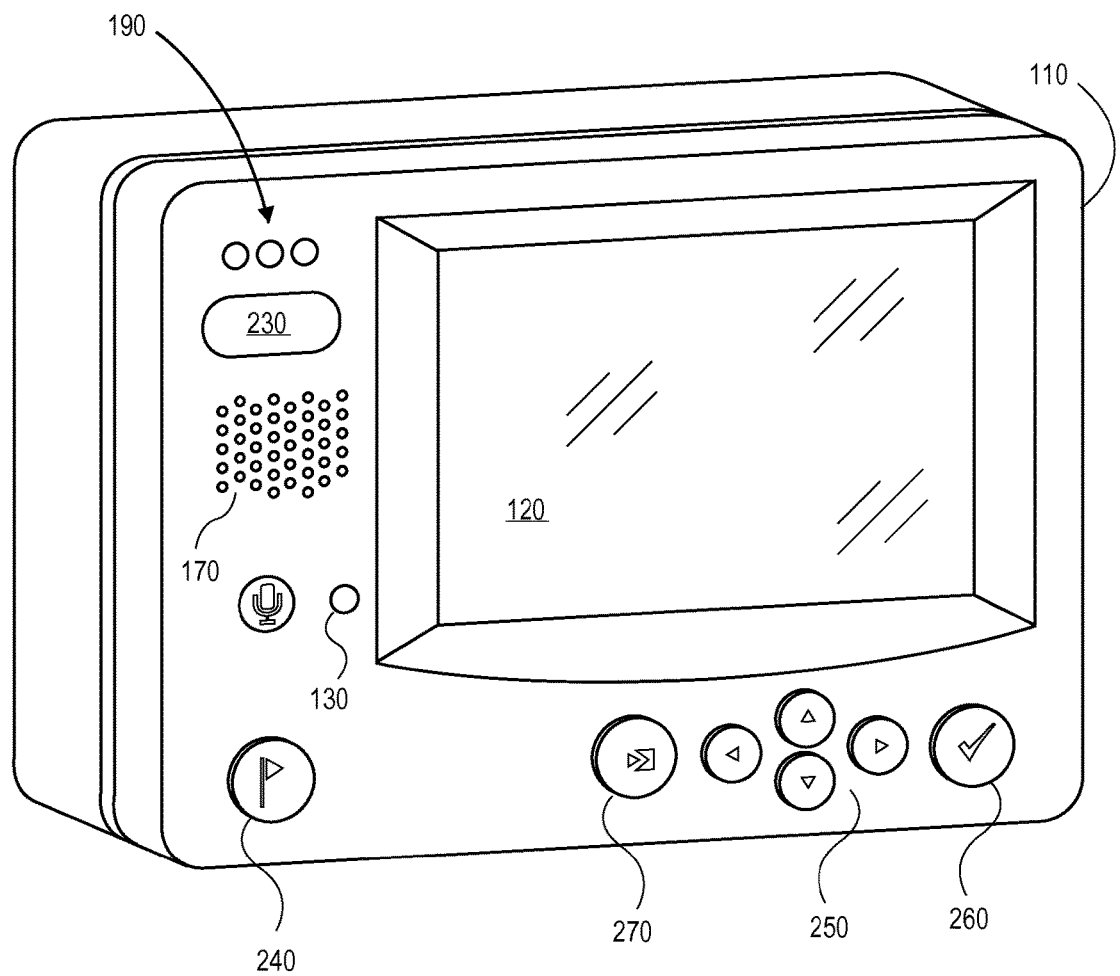
FIG. 2 is a perspective view of a video system constructed according to one embodiment of the invention.

An exemplary console is illustrated in FIG. 2. In one embodiment, the console 110 is relatively small and lightweight. By way of example, the console 110 is between five inches and ten inches wide, between three inches and five inches tall, and between once-half inch and two inches thick. In one embodiment, the console 110 is weatherproof, including waterproof, such that it may be used in situations where it is exposed to moisture and other elements. Embodiments of the console would be weatherproof, including weatherproofing the input buttons, display, speaker, LED indicators, internal microphone, and internal camera. In other embodiments, the external camera, external components, and the connections to the console would be weatherproof as well. Further embodiments may include weatherproof plugs or covers for unused input and output connectors. Other embodiments may provide for a detachable or a fixed sun shield 280 to assist in glare prevention. (See FIG. 8).

In some embodiments, the system 100 may include one or more mounting elements for mounting the console 110 on a vehicle in such a way that movement and vibrations from the vehicle do not cause unintentional movement of the console 110. Such mounting elements may be configured to mount the console 110 on a vehicle windshield, on a motorcycle or ATV handlebar, on a boat or on another vehicle component. In one embodiment, the mounting element comprises a handle bar mount and a ball-hinge element configured for intentional adjustments. Other embodiments of the mounting elements may comprise grip mounts, ball mounts, suction mounts, fixed mounts, screw mounts, ventilation mounts, brackets, magnets, hinges, or any combination or variation of the elements listed herein.

In one embodiment, power is supplied to the components of the video system 100 from the vehicle. Some embodiments may have a weatherproofed power button exposed on the housing. The power provided is heavily filtered and regulated to avoid interference. The video system, using the particular components described herein, may require 4 amps from a 10 V to 24 V DC power supply. The video system 110 may include a cable that is configured to plug into the power input connector of the console housing and into a standard vehicle power jack, such as a "cigarette lighter" type power jack. It should be noted that the illustrated embodiment of the invention does not include an internal power source. However, some embodiments of the system 110 may include an internal power source, such as a battery. Additionally, the system 100 may be provided with a "stealth" mode in which the camera 130,220 and the microphone 160 are active and recording, but the lights and indicators 190, such as the one or more LEDs 190, are turned off, thereby making the system 100 appear to be dormant. Furthermore, the system 100 may provide "pre-event" recording in which the system 100 records constantly in a loop of a selected duration of time, such as thirty seconds or sixty seconds, so that when an event triggers recording, the events occurring shortly prior to the initiation of recording are also recorded and stored.

Various embodiments of the system 100 include any one or more of the following features: required entry of a password or code prior to accessing and changing operational settings; required use of a key to unlock a lockable housing 110 for removal of any removable memory components; incorporation of electronic watermarks into the recorded video images to prevent tampering or alteration; wireless downloading of the contents of the memory to a laptop or other computer; streaming the live video from the camera and possibly other inputs and/or outputs via a high-speed wireless data network; encoding of multiple video streams from four or more cameras simultaneously; a remote control device for allowing a user to remotely control the operation of the system 100; a temperature sensor and temperature indicator operable to detect and warn the user if the system 100 is at risk of malfunction or damage due to an ambient temperature that is too high or too low for proper operation, such as may easily occur in a vehicle on a very hot or very cold day. The console housing 110, and possibly the housings of other components of the system 100, may be vented to dissipate heat, and may include other passive or active features to moderate temperature, especially in relatively extreme environments.

Although various exemplary data formats and data transfer protocols are identified above, it is contemplated that any suitable format or protocol, whether now existing or hereafter developed, may be used in conjunction with embodiments of the invention. The discussion of specific formats or protocols herein is not intended to limit the scope of the invention. For example, although the MPEG-4 format is mentioned above for encoding and storing audiovisual data obtained by the system, it is contemplated that other formats such as, for example, H.263 and H.264, may also be used. Likewise, audiovisual data may be stored in high-definition (HD) format. Hardware or software changes or upgrades may be required in order to change formats, however the inventive functionality of the system, as described herein, is preserved regardless of the specific format used. Law enforcement's implementations of the system are generally used to produce an evidentiary record, therefore one embodiment may incorporate a lossless format.

In addition to various suitable formats that may be used in conjunction with embodiments of the system 100, it is contemplated that any suitable data transfer protocol may be used. For example, real-time streaming protocol (RTSP) may be used to transfer data in the system 100 providing that the system 100 is adapted to recover any lost frames from the camera 130,220. User datagram protocol (UDP) provides a better, lossless protocol for use with the system 100. Any suitable existing protocol may be used, and new protocols may be developed for use with the system 100. Because implementations of the system 100 include a data storage function in the camera 130,220, as described above, for retrieval of frames lost during data transfer, it is contemplated that typical IP cameras having such a storage feature may be used, with the system 100 ensuring that lost frames are faithfully transmitted to the electronics module 140 when requested therefrom.

As noted above, embodiments of the system 100 may be used with a variety of software, audiovisual formats, data transfer protocols, and the like. In some instances, changes to formats or protocols, or even making hardware changes such as upgrading the system to a HD-capable camera, may require that the software of the system 100 be updated. In some implementations of the system 100, it is contemplated that the system software will be capable of being upgraded in the field. In such implementations, software upgrades may be provided via a memory card, portable flash memory device, a wireless data link to a portable device, a wireless internet data link, or any other suitable device or method for upgrading the system software in the field. In some implementations wherein wireless communications are used for system upgrades, it is contemplated that embodiments of the system may optionally include a wireless communications component adapted to connect to a remote source for obtaining updates automatically. Such communications could, for example, be carried out over the internet via a cellular communications signal that allows embodiments of the system to access the internet. Other embodiments could utilize wireless technologies such as WiFi, Bluetooth, Near Field Communications, radio frequency (RF), or infrared (IR) to communicate with a computing device operable to send software upgrades to embodiments of the system 100.

Embodiments of the invention may also comprise one or more computer programs stored in or on computer-readable medium residing on or accessible by the electronics module 140. The computer programs may comprise listings of executable instructions for implementing logic functions and can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory medium that can contain, store, or communicate the programs. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc read-only memory (CDROM).

The video system 100 can be allowed to upload recordings to an external server or computing device. The external server or computing device could be a computing device housed in the vehicle or could be a centralized computing device, such as housed at a police precinct. Multiple Wi-Fi authorized upload times can be set, which denote when multiple video systems are allowed to upload data. Ideally, upload times will be set during non-use times such as shift changes, lunch breaks, and off duty times. Alternatively, uploading of recorded data can occur whenever the recording devices are within a predetermined distance from the external server or computing device, such as when the officer is located in the vehicle or, preferable, when the officer's vehicle is located near the police precinct. Upload settings can be changed as well.

In addition to what has been described above, various peripheral devices may be utilized in conjunction with embodiments of the invention. In law enforcement implementations of the system 100, for example, or in other implementations where security is important, the system 100 may be provided with a biometric identification component or other secure identification component. In an implementation of the system 100 requiring biometric identification, for example, a fingerprint may be required before a user of the system 100 can log into the system 100 and begin to use the system 100. Other security peripherals include, for example, a dongle carried by a user of the system 100 that can be presented to the system 100 in order to verify the identity of a user. Any suitable security component or method may be included with embodiments of the invention.

In addition to maintaining or verifying user security, embodiments of the system 100 may also include additional components to establish the security and evidentiary value of the audiovisual data recorded thereby. For example, it is contemplated that the camera 130,220 associated with the embodiments of the system 100 include a unique identifier, such as a serial number or other identifier that is unalterable, and that audiovisual signals obtained by any given camera are stamped with that camera's identifier. Thus, the identity of the camera that acquired any given data is verified and secured along with the actual data recorded by the system 100.

Peripheral devices used for interfacing with the embodiments of the system 100 may also be provided. For example, a keyboard may be provided, the keyboard adapted to plug directly into embodiments of the system 100 or to communicate wirelessly with embodiments of the system 100 via Bluetooth, infrared, or other suitable method of wireless communication. Further, it is contemplated that a PDA, laptop, smartphone, or other mobile device may be adapted (for example by installing software thereon) for communication with and manipulation of embodiments of the system 100. Such devices may be used to manipulate a display associated with embodiments of the system 100, or to configure or control embodiments of the system 100.

With respect to any of the various peripherals that may be associated with embodiments of the system 100, whether described herein or not, it is contemplated that the peripherals may be plugged into or otherwise associated with electronics module 140 or that any of cameras 130,220 may be adapted to communicate with the peripherals, either through a hard-wired or wireless connection.

Although the invention has been disclosed with reference to various particular embodiments, it is understood that equivalents may be employed and substitutions made herein without departing from the contemplated scope of the invention. For example, specific suitable hardware, processors, software, and the like as described above is exemplary and not intended to limit embodiments of the invention. Any suitable hardware may be used to implement the inventive functionality of embodiments of the system.

Having thus described the invention, what is claimed as new and desirable to be protected by Letters Patent includes the following:

1. A video system for a motorcycle, the system comprising:
   a single enclosed housing, configured to be mounted on the motorcycle;
   at least one video camera mounted on the motorcycle external to the single enclosed housing; and
   at least one camera mounted in the single enclosed housing,
   wherein each camera is operable to capture video and automatically stamp the video with a unique unalterable camera identifier uniquely identifying the camera;
   an electronics module enclosed in the single enclosed housing, the electronics module being operable to receive and timestamp the video and to modify event metadata;
   a memory for receiving and storing the captured video from the electronics module, the memory being enclosed in the single enclosed housing;
   a plurality of input buttons integrated into the single enclosed housing;
   a display monitor integrated into the single enclosed housing,
   wherein the integrated display monitor and the integrated plurality of input buttons are configured to provide a user interface to a law enforcement officer,
   wherein the integrated plurality of input buttons are programmed to allow the law enforcement officer to input event metadata on-site,
   wherein the integrated display monitor is operable to selectively display the user interface,
   wherein the video system is adapted to communicate wirelessly with an external computing device,
   wherein the external computing device is configured to manipulate the display monitor,
   wherein the event metadata comprises an event descriptor describing law enforcement activity recorded in the video,
   wherein the event descriptor is selected from the group consisting of event type, suspect ethnicity, suspect age, and vehicle identifying information;
   a microphone operable to capture audio, wherein the electronics module is operable to receive the audio; and
   a mounting element operable to mount the single enclosed housing on the motorcycle.

2. The video system as set forth in claim 1, wherein the video system is operable to implement a pre-event recording loop.

3. The video system as set forth in claim 1, wherein the single enclosed housing is waterproof.

4. The video system as set forth in claim 1, wherein the at least one video camera mounted on the motorcycle external to the single enclosed housing is waterproof.

5. The video system as set forth in claim 1, having at least one software component for implementing the functionality of the system, wherein said at least one software component of said system is upgradeable while said system is located in the field as during normal use of the system.

6. The video system as set forth in claim 5, wherein an upgrade of said at least one software component is performed by use of an external device adapted to interface via a wireless connection with said video system.

7. The video system as set forth in claim 1, wherein the external computing device is selected from the group consisting of a PDA, a smartphone, and a laptop.

8. The video system as set forth in claim 1, wherein the memory is a plurality of memory modules operable to provide data redundancy in the event of a failure of at least one of the plurality of memory modules.

9. The video system as set forth in claim 1, wherein the mounting element is comprised of a handle bar mount and a ball-hinge element.

10. A video system for a motorcycle, the system comprising:
    a single enclosed housing, configured to be mounted on the motorcycle;
    at least one video camera mounted on the motorcycle external to the single enclosed housing; and
    at least one camera mounted in the single enclosed housing,
    wherein each camera is operable to capture video and automatically stamp the video with a unique unalterable camera identifier uniquely identifying the camera;

an electronics module enclosed in the single enclosed housing, the electronics module being operable to receive the video and modify event metadata;

a memory for receiving and storing the captured video from the electronics module, the memory being enclosed in the single enclosed housing;

a plurality of input buttons integrated into the single enclosed housing;

a display monitor integrated into the single enclosed housing, wherein the integrated display monitor and the integrated plurality of input buttons are configured to provide a user interface to a law enforcement officer, wherein the integrated plurality of input buttons are programmed to allow the law enforcement officer to input event metadata on-site, wherein the integrated display monitor is operable to selectively display the user interface, wherein the video system is adapted to communicate wirelessly with an external computing device, wherein the external computing device is configured to manipulate the display monitor, wherein said event metadata comprises an event descriptor describing law enforcement activity recorded in the video, wherein the event descriptor is selected from the group consisting of event type, suspect ethnicity, suspect age, and vehicle identifying information;

a microphone operable to capture audio, wherein the electronics module is operable to receive the audio; and a mounting element operable to mount the single enclosed housing on the motorcycle.

11. The video system as set forth in claim 10, wherein the video system is operable to implement a pre-event recording loop.

12. The video system as set forth in claim 10, wherein the single enclosed housing is waterproof.

13. The video system as set forth in claim 10, wherein the at least one video camera mounted on the motorcycle external to the single enclosed housing is waterproof.

14. The video system as set forth in claim 10, having at least one software component for implementing the functionality of the system, wherein said at least one software component of said system is upgradeable while said system is located in the field as during normal use of the system.

15. The video system as set forth in claim 14, wherein an upgrade of said at least one software component is performed by use of an external device adapted to interface via a wired connection with said video system.

16. The video system as set forth in claim 10, wherein the external computing device is selected from the group consisting of a PDA, a smartphone, and a laptop.

17. The video system as set forth in claim 10, wherein the memory is a plurality of memory modules operable to provide data redundancy in the event of a failure of at least one of the plurality of memory modules.

18. The video system as set forth in claim 10, wherein the mounting element is comprised of a handle bar mount and a ball-hinge element.

\* \* \* \* \*